US010196493B2

(12) United States Patent
Otero Martinez et al.

(10) Patent No.: US 10,196,493 B2
(45) Date of Patent: Feb. 5, 2019

(54) POLYURETHANES HAVING REDUCED ALDEHYDE EMISSION

(71) Applicant: BASF SE, Ludwigshafen (DE)

(72) Inventors: Iran Otero Martinez, Stemwede (DE); Georg Partusch, Puergen (DE); Christian Hagen, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 109 days.

(21) Appl. No.: 15/100,777

(22) PCT Filed: Nov. 27, 2014

(86) PCT No.: PCT/EP2014/075870
§ 371 (c)(1),
(2) Date: Jun. 1, 2016

(87) PCT Pub. No.: WO2015/082316
PCT Pub. Date: Jun. 11, 2015

(65) Prior Publication Data
US 2016/0304686 A1 Oct. 20, 2016

(30) Foreign Application Priority Data
Dec. 2, 2013 (EP) .................................... 13195350

(51) Int. Cl.
C08J 9/00 (2006.01)
C08G 18/28 (2006.01)
C08G 18/08 (2006.01)
C08G 18/48 (2006.01)
C08G 18/72 (2006.01)
C08G 101/00 (2006.01)

(52) U.S. Cl.
CPC ............ *C08J 9/0033* (2013.01); *C08G 18/14* (2013.01); *C08G 18/2895* (2013.01); *C08G 18/482* (2013.01); *C08G 18/725* (2013.01); *C08G 2101/00* (2013.01); *C08G 2101/0066* (2013.01); *C08G 2101/0083* (2013.01); *C08J 2207/06* (2013.01); *C08J 2375/08* (2013.01)

(58) Field of Classification Search
CPC .. C08G 18/14; C08G 18/2895; C08G 18/482; C08G 18/725; C08G 2101/00; C08G 2101/0066; C08G 2101/0083; C08J 9/0033; C08J 2207/06; C08J 2375/08
See application file for complete search history.

(56) References Cited

U.S. PATENT DOCUMENTS

| 3,304,273 | A | 2/1967 | Stamberger |
| 3,383,351 | A | 5/1968 | Stamberger |
| 3,523,093 | A | 8/1970 | Stamberger |
| 5,506,275 | A | 4/1996 | Valoppi |
| 6,136,876 | A | 10/2000 | Meier et al. |
| 2006/0141236 | A1 | 6/2006 | Nakamura et al. |
| 2012/0178839 | A1 | 7/2012 | Burdeniuc et al. |
| 2013/0065978 | A1 | 3/2013 | Burdeniuc et al. |
| 2013/0197114 | A1* | 8/2013 | Burdeniuc ............ C08G 18/302 521/128 |
| 2013/0203880 | A1 | 8/2013 | George et al. |

FOREIGN PATENT DOCUMENTS

| CN | 101613447 A | 12/2009 |
| CN | 103055465 A | 4/2013 |
| DE | 111394 | 7/1900 |
| DE | 1 152 536 | 8/1963 |
| DE | 1 152 537 | 8/1963 |
| EP | 0 090 444 A2 | 10/1983 |
| EP | 0 364 854 A2 | 4/1990 |
| EP | 0 897 402 | 2/1999 |
| EP | 0 989 146 A1 | 3/2000 |
| EP | 1 002 816 A2 | 5/2000 |
| EP | 1 428 847 A1 | 6/2004 |
| EP | 1 460 094 A1 | 9/2004 |
| EP | 1 529 792 A1 | 5/2005 |
| EP | 1 674 515 A1 | 6/2006 |
| EP | 1 888 664 | 2/2008 |
| WO | WO 2005/090440 A1 | 9/2005 |
| WO | WO 2006/034800 A1 | 4/2006 |
| WO | WO 2006/042674 A1 | 4/2006 |
| WO | WO 2008/055952 A1 | 5/2008 |
| WO | WO 2009/128279 A1 | 10/2009 |
| WO | WO 2013/006425 A1 | 1/2013 |

OTHER PUBLICATIONS

International Search Report and Written Opinion dated Feb. 3, 2015 in PCT/EP2014/075870 (with English translation of Categories of Cited Documents).
"Polyurethane Kunststoff Handbuch" Carl Hanser Verlag, 3 neu bearbeitete Auflage, vol. 7, Chapter 5, 1993, 75 Pages.
"Polyurethane Kunststoff Handbuch" Carl Hanser Verlag, 3 neu bearbeitete Auflage, vol. 7, Chapter 6, 1993, 55 Pages.
"Polyurethane Kunststoff Handbuch" Carl Hanser Verlag, 3 neu bearbeitete Auflage, vol. 7, Chapter 7, 1993, 64 Pages.
"Polyurethane Kunststoff Handbuch" Carl Hanser Verlag, 3 neu bearbeitete Auflage, vol. 7, Chapter 3.2 and 3.3.2, 1993, 26 Pages.

(Continued)

*Primary Examiner* — John M Cooney
(74) *Attorney, Agent, or Firm* — Oblon, McClelland, Maier & Neustadt, L.L.P.

(57) ABSTRACT

The present invention relates to a process for the production of polyurethanes where (a) polyisocyanate, (b) polymeric compounds having groups reactive toward isocyanates, (c) catalysts, (d) a CH-acidic compound of the general formula $R^1$—$CH_2$—$R^2$, where $R^1$ and $R^2$ independently of one another are an electron-withdrawing moiety of the general formula —C(O)—$R^3$ or —CN, where the moiety $R^3$ is selected from the group consisting of —$NH_2$, —NH—$R^4$— $NR^5R^6$, $OR^7$ or $R^8$, where $R^4$, $R^5$, $R^6$, $R^7$, and $R^8$ are independently selected from the group consisting of aliphatic, araliphatic or aromatic hydrocarbons, which may have substitution, and optionally (e) blowing agent, (f) chain extender and/or crosslinking agent, and (g) auxiliaries and/ or additives are mixed to give a reaction mixture, and the reaction mixture is allowed to complete a reaction to give the polyurethane. The present invention further relates to polyurethanes produced by this process and to the use of these polyurethanes in the interior of means of transport.

13 Claims, No Drawings

(56) References Cited

OTHER PUBLICATIONS

"Polyurethane Kunststoff Handbuch" Carl Hanser Verlag, 3 neu bearbeitete Auflage, vol. 7, Chapter 3.1, 1993, 21 Pages.
"Polyurethane Kunststoff Handbuch" Carl Hanser Verlag, 3 neu bearbeitete Auflage, vol. 7, Chapter 3.4.5, 1993, 6 Pages.
"Polyurethane Kunststoff Handbuch" Carl Hanser Verlag, 3 neu bearbeitete Auflage, vol. 7, Chapter 3.4.4, 1993, 5 Pages.
"Polyurethane Kunststoff Handbuch" Carl Hanser Verlag, 3 neu bearbeitete Auflage, vol. 7, Chapter 3.4.6 and 3.4.11, 1993, 9 Pages.
International Search Report dated Feb. 3, 2015 in PCT/EP2014/075870 (with English language translation).
International Preliminary Report on Patentability dated Feb. 11, 2016 in PCT/EP2014/075870 (with English language translation).
U.S. Appl. No. 13/731,275, filed Dec. 31, 2012, US 2013-0172435 A1, Iran Otero Martinez, et al.
U.S. Appl. No. 13/949,595, filed Jul. 24, 2013, US 2014-0031444 A1, Iran Otero Martinez, et al.
U.S. Appl. No. 14/021,351, filed Sep. 9, 2013, US 2014-0073712 A1, Iran Otero Martinez, et al.
U.S. Appl. No. 14/899,923, filed Dec. 18, 2015, US 2016-0137814 A1, Iran Otero Martinez, et al.
U.S. Appl. No. 15/101,183, filed Jun. 2, 2016, Iran Otero Martinez.
The Second Office Action dated Aug. 21, 2018 in Chinese Patent Application No. 201480064735.9 with English translation.

\* cited by examiner

POLYURETHANES HAVING REDUCED ALDEHYDE EMISSION

The present invention relates to the production of polyurethanes where (a) polyisocyanate, (b) polymeric compounds having groups reactive toward isocyanates, (c) catalysts, (d) a CH-acidic compound of the general formula $R^1$—$CH_2$—$R^2$, where $R^1$ and $R^2$ independently of one another are an electron-withdrawing moiety of the general formula —C(O)—$R^3$ or —CN, where the moiety $R^3$ is selected from the group consisting of —$NH_2$, —NH—$R^4$—$NR^5R^6$, $OR^7$ or $R^8$, where $R^4$, $R^5$, $R^6$, $R^7$, and $R^8$ are independently selected from the group consisting of aliphatic, araliphatic or aromatic hydrocarbons, which may have substitution, and optionally (e) blowing agent, (f) chain extender and/or crosslinking agent, and (g) auxiliaries and/or additives are mixed to give a reaction mixture, and the reaction mixture is allowed to complete a reaction to give the polyurethane. The present invention further relates to polyurethanes produced by this process and to the use of these polyurethanes in the interior of means of transport.

Polyurethanes are versatile, being used by way of example as seat cushioning in the furniture industry and as binders for particleboard, as insulation material in the construction industry, as insulation material by way of example for pipes, hot-water tanks, and refrigerators, and as cladding components, for example in vehicle construction. In particular, polyurethanes are frequently used in automobile construction, for example in the external cladding of automobiles as spoilers, roof elements, and springing elements, and also in the interior cladding of automobiles as roof cladding, carpet-backing foam, door cladding, steering rings, control knobs, and seat cushioning.

In this context it is known that polyurethanes tend to emit organic substances which can cause unpleasant odors or, in the event of high concentration, can cause health-related problems. Enclosed spaces are in particular affected here, for example in the interiors of buildings or of vehicles such as automobiles. An example of these emissions is emission of aldehydes. Various attempts have already been made to reduce these aldehyde emissions.

By way of example EP 1428847 says that aldehyde emissions can be reduced by subsequently adding polymeric substances having primary and/or secondary amino groups. Responsible for the reduction in emissions are the amine groups in the polymer. Since they are isocyanate-reactive and are very largely deactivated by reaction with the isocyanate, the polymeric active ingredient ought to be given to the foam already produced. A disadvantage here is a complex process with an additional step of aftertreatment of the foam. There is no possibility for use in compact systems or closed-cell foams.

US 2006/0141236 describes the use of hydrazine compounds as aldehyde scavengers in polyurethanes. In this case the active substance is introduced directly into the polyol component. Hydrazines and hydrazine derivatives, however, have a catalytic activity and may influence the polyurethane reaction. Moreover, only a low level of reduction in aldehyde emissions is obtained, of around 60%.

US 20130203880 describes the use of polyhydrazodicarbonamide as a substance for reducing aldehyde emissions in polyurethane foams. A significant reduction in aldehydes is achieved, however, only when the amount of polyhydrazodicarbonamide added is large, being from 2 to 5.5% by weight in the polyol component. Since polyhydrazodicarbonamide likewise has catalytic properties, the reaction profile is altered through the addition of this substance in this order of magnitude.

It was an object of the present invention to provide polyurethanes, in particular polyurethane foams, which exhibit reduced emission of organic compounds, more particularly reduced aldehyde emission. A particular intention was to show a long-lasting activity for the substances responsible for reduced aldehyde emission, and to cause no additional emissions on the part of the polyurethane. Moreover, the low-emission polyurethane foams are to be capable of being produced by a simple method, which allows for the substances responsible for reducing the aldehyde emissions to be added directly to the reaction mixture for producing the polyurethane. The intention here is in particular to use substances which are inexpensive and easy to handle, and which do not impair the production of the polyurethanes.

Surprisingly, the object of the invention has been achieved via a process for the production of polyurethanes where (a) polyisocyanate, (b) polymeric compounds having groups reactive toward isocyanates, (c) catalysts, (d) a CH-acidic compound of the general formula $R^1$—$CH_2$—$R^2$, where $R^1$ and $R^2$ independently of one another are an electron-withdrawing moiety of the general formula —C(O)—$R^3$ or —CN, where the moiety $R^3$ is selected from the group consisting of —$NH_2$, —NH—$R^4$—$NR^5R^6$, $OR^7$ or $R^8$, where $R^4$, $R^5$, $R^6$, $R^7$, and $R^8$ independently are selected from the group consisting of aliphatic, araliphatic or aromatic hydrocarbons, which may have substitution, and optionally (e) blowing agent, (f) chain extender and/or crosslinking agent, and (g) auxiliaries and/or additives are mixed to give a reaction mixture, and the reaction mixture is allowed to complete a reaction to give the polyurethane.

For the purposes of the invention, the term polyurethane comprises all of the known polyisocyanate polyaddition products. These comprise adducts of isocyanate and alcohol, and also comprise modified polyurethanes which can comprise isocyanurate structures, allophanate structures, urea structures, carbodiimide structures, uretonimine structures, biuret structures, and other isocyanate adducts. In particular, these polyurethanes of the invention comprise compact polyisocyanate polyaddition products, for example thermosets, and foams based on polyisocyanate polyaddition products, for example flexible foams, semirigid foams, rigid foams, and integral foams, and also polyurethane coatings and binders. For the purposes of the invention, the term polyurethanes moreover includes polymer blends comprising polyurethanes and other polymers, and also foams made of said polymer blends. It is preferable that the polyurethanes of the invention are polyurethane foams or compact polyurethanes which comprise no polymers other than the polyurethane units (a) to (g) explained hereinafter.

For the purposes of the invention, the term polyurethane foams use foams in accordance with DIN 7726. The compressive stress value for 10% compression, or compressive strength in accordance with DIN 53 421/DIN EN ISO 604 of flexible polyurethane foams of the invention here is 15 kPa or less, preferably from 1 to 14 kPa, and in particular from 4 to 14 kPa. The compressive stress value for 10% compression in accordance with DIN 53 421/DIN EN ISO 604 of semirigid polyurethane foams of the invention is from more than 15 kPa to less than 80 kPa. The open-cell factor of semirigid polyurethane foams and flexible polyurethane foams of the invention in accordance with DIN ISO 4590 is preferably greater than 85%, particularly preferably greater than 90%. Further details relating to flexible polyurethane foams and semirigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 5.

The compressive stress value for 10% compression of rigid polyurethane foams of the invention is greater than or equal to 80 kPa, preferably greater than or equal to 120 kPa, particularly preferably greater than or equal to 150 kPa. The closed-cell factor of the rigid polyurethane foam in accordance with DIN ISO 4590 is moreover more than 80%, preferably more than 90%. Further details relating to rigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 6.

For the purposes of this invention, the term elastomeric polyurethane foams means polyurethane foams in accordance with DIN 7726 which after brief deformation by 50% of thickness in accordance with DIN 53 577 after 10 minutes exhibit no residual deformation exceeding 2% of their initial thickness. This can apply to a rigid polyurethane foam, a semirigid polyurethane foam, or a flexible polyurethane foam.

Integral polyurethane foams are polyurethane foams in accordance with DIN 7726 with a marginal zone which, as a result of the shaping process, has higher density than the core. The overall apparent density averaged over the core and the marginal zone here is preferably above 100 g/L. Again, integral polyurethane foams for the purposes of the invention can be rigid polyurethane foams, semirigid polyurethane foams, or flexible polyurethane foams. Further details relating to integral polyurethane foams of the invention can be found in "Kunststoffhandbuch [Plastics handbook], volume 7, Polyurethane [Polyurethanes]", Carl Hanser Verlag, 3$^{rd}$ edition 1993, chapter 7.

The polyurethanes of the invention are obtained here in that polyisocyanates (a) are mixed with polymeric compounds (b) having groups reactive toward isocyanates, optionally catalysts (c), CH-acidic compounds (d), and optionally blowing agent (e), chain extender (f), and other auxiliaries and additives (g) to give a reaction mixture, and allowing completion of a reaction.

In a preferred embodiment, the polyurethane of the invention here is a polyurethane foam with an average density of 20 to 850 g/L, preferably a semirigid polyurethane foam, or a flexible polyurethane foam, or a rigid polyurethane foam, particularly preferably an elastomeric flexible polyurethane foam, a semirigid polyurethane foam, or an elastomeric integral polyurethane foam. It is preferable that the density of the elastomeric integral polyurethane foam averaged over the core and the marginal zone is from 150 to 500 g/L. It is preferable that the average density of the flexible polyurethane foam is from 10 to 100 g/L. It is preferable that the average density of the semirigid polyurethane foam is from 70 to 150 g/L.

In another preferred embodiment, the polyurethane is a compact polyurethane with a density that is preferably more than 850 g/L, preferably from 900 to 1400 g/L, and particularly preferably from 1000 to 1300 g/L. A compact polyurethane is obtained here without addition of a blowing agent. Small quantities of blowing agent, for example water, comprised in the polyols as a result of a production process are not counted as blowing agent here. It is preferable that the reaction mixture for the production of the compact polyurethane comprises less than 0.2% by weight of water, particularly less than 0.1% by weight, and in particular less than 0.05% by weight.

The polyurethane of the invention is preferably used here in the interior of means of transport, for example ships, aircraft, trucks, cars, or buses, particularly cars or buses, and in particular cars. The term automobile interior is used hereinafter for the interior of cars and buses. It is possible here to use a flexible polyurethane foam as seat cushion, a semirigid polyurethane foam as foam backing of door side elements or of instrument panels, an integral polyurethane foam as steering wheel, control knob, or headrest, and a compact polyurethane by way of example as cable-sheathing.

The polyisocyanate components (a) used for the production of the polyurethanes of the invention comprise any of the polyisocyanates known for the production of polyurethanes. These comprise the aliphatic, cycloaliphatic, and aromatic difunctional or polyfunctional isocyanates known from the prior art, and also any desired mixtures thereof. Examples are diphenylmethane 2,2'-, 2,4'-, and 4,4'-diisocyanate, the mixtures of monomeric diphenylmethane diisocyanates with diphenylmethane diisocyanate homologs having a larger number of rings (polymer MDI), isophorone diisocyanate (IPDI) and its oligomers, tolylene 2,4- and 2,6-diisocyanate (TDI), and mixtures of these, tetramethylene diisocyanate and its oligomers, hexamethylene diisocyanate (HDI) and its oligomers, naphthylene diisocyanate (NDI), and mixtures thereof.

It is preferably to use tolylene 2,4- and/or 2,6-diisocynate (TDI) or a mixture thereof, monomeric diphenylmethane diisocyanates, and/or diphenylmethane diisocyanate homologs having a larger number of rings (polymer MDI), and mixtures of these. Other possible isocyanates are mentioned by way of example in "Kunststoffhandbuch [Plastics handbook], volume 7, Polyurethane [Polyurethanes]", Carl Hanser Verlag, 3$^{rd}$ edition 1993, chapter 3.2 and 3.3.2.

Polyisocyanate component (a) used can take the form of polyisocyanate prepolymers. These polyisocyanates prepolymers are obtainable by reacting the polyisocyanates described above (constituent (a-1)) in excess, for example at temperatures of from 30 to 100° C., preferably at about 80° C., with polymeric compounds (b) (constituent (a-2)), having groups reactive toward isocyanates, and/or with chain extenders (c) (constituent (a-3)) to give the isocyanate prepolymer.

Polymeric compounds (a-2) having groups reactive toward isocyanates, and chain extenders (a-3), are known to the person skilled in the art and are described by way of example in "Kunststoffhandbuch [Plastics handbook], volume 7, Polyurethane [Polyurethanes]", Carl Hanser Verlag, 3$^{rd}$ edition 1993, chapter 3.1: by way of example, it is also possible to use, as polymeric compounds (a-2) having groups reactive toward isocyanates, the polymeric compounds described under (b) having groups reactive toward isocyanates.

It is possible to use, as polymeric compounds (b) having groups reactive toward isocyanates, any of the known compounds having at least two hydrogen atoms reactive toward isocyanates, for example those with functionality from 2 to 8 and with number-average molar mass from 400 to 15 000 g/mol: by way of example it is possible to use compounds selected from the group of the polyether polyols, polyester polyols, and mixtures thereof.

Polyetherols are by way of example produced from epoxides, for example propylene oxide and/or ethylene oxide, or from tetrahydrofuran with starter compounds exhibiting hydrogen-activity, for example aliphatic alcohols, phenols, amines, carboxylic acids, water, or compounds based on natural substances, for example sucrose, sorbitol or mannitol, with use of a catalyst. Mention may be made here of basic catalysts and double-metal cyanide catalysts, as described by way of example in PCT/EP2005/010124, EP 90444, or WO 05/090440.

Polyesterols are by way of example produced from aliphatic or aromatic dicarboxylic acids and polyhydric alcohols, polythioether polyols, polyesteramides, hydroxylated polyacetals, and/or hydroxylated aliphatic polycarbonates, preferably in the presence of an esterification catalyst. Other possible polyols are mentioned by way of example in "Kunststoffhandbuch [Plastics handbook], volume 7, Polyurethane [Polyurethanes]", Carl Hanser Verlag, 3$^{rd}$ edition 1993, chapter 3.1.

Other materials that can be used, alongside the polyetherols and polyesterols described, are polyetherols or polyesterols which are also termed polymer polyetherols or polymer polyesterols and which comprise fillers. These compounds preferably comprise dispersed particles made of thermoplastics, for example composed of olefinic monomers such as acrylonitrile, styrene, (meth)acrylates, (meth)acrylic acid, and/or acrylamide. These polyols comprising fillers are known and are obtainable commercially. A production process for these is described by way of example in DE 111 394, U.S. Pat. No. 3,304,273, U.S. Pat. No. 3,383,351, U.S. Pat. No. 3,523,093, DE 1 152 536, DE 1 152 537 WO 2008/055952, and WO 2009/128279.

In a particularly preferred embodiment of the present invention, component (b) comprises polyetherols, and more preferably comprises no polyesterols.

Catalysts (c) greatly accelerate the reaction of the polyols (b) and optionally chain extender and crosslinking agent (f), and also chemical blowing agent (e) with the organic, optionally modified polyisocyanates (a). The catalysts (c) here comprise incorporable amine catalysts. These have at least one, preferably from 1 to 8, and particularly preferably from 1 to 2, groups reactive toward isocyanates, for example primary amine groups, secondary amine groups, hydroxy groups, amides, or urea groups, preferably primary amine groups, secondary amine groups, or hydroxy groups. Incorporable amine catalysts are used mostly for the production of low-emission polyurethanes which are in particular used in the automobile-interior sector. These catalysts are known and are described by way of example in EP1888664. These comprise compounds which preferably comprise, alongside the group(s) reactive toward isocyanates, one or more tertiary amino groups. It is preferable that at least one tertiary amino groups of the incorporable catalysts bears at least two aliphatic hydrocarbon moieties, preferably having from 1 to 10 carbon atoms per moiety, particularly preferably having from 1 to 6 carbon atoms per moiety. It is particularly preferable that the tertiary amino groups bear two moieties selected mutually independently from methyl and ethyl moiety, and also bear another organic moiety. Examples of incorporable catalysts that can be used are bisdimethylaminopropylurea, bis(N,N-dimethylaminoethoxyethyl) carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol), and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3 aminopropyl)bis(aminoethyl ether), 3-dimethylaminoisopropyldiisopropanolamine, and mixtures thereof.

It is also possible to use conventional catalysts, alongside the incorporable amine catalysts, to produce the polyurethanes. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo [3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. It is also possible to use organometallic compounds, preferably organotin compounds, such as tin(II) salts of organic carboxylic acids, e.g. tin(II) acetate, tin(II) octoate, tin(II) ethylhexoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts. In a particularly preferred embodiment, catalysts (c) used comprise exclusively incorporable catalysts.

If catalysts (c) are used, these can by way of example be used at a concentration of from 0.001 to 5% by weight, in particular from 0.05 to 2% by weight, as catalyst or, respectively, catalyst combination, based on the weight of component (b).

Employed as component (d) are one or more CH-acidic compounds of the general formula $R^1$—$CH_2$—$R^2$. The acidity of the $CH_2$ group here is generated through two electron-withdrawing moieties $R^1$ and $R^2$. The compound of the general formula $R^1$—$CH_2$—$R^2$ is a CH-acidic compound if the moieties $R^1$ and $R^2$ independently of one another are moieties of the general formula —C(O)—$R^3$ or —CN, where the moiety $R^3$ is selected from the group consisting of —$NH_2$, —NH—$R^4$—$NR^5R^6$, $OR^7$ or $R^8$. The moieties $R^4$, $R^5$, $R^6$, $R^7$, and $R^8$ here are selected independently from the group consisting of aliphatic, araliphatic or aromatic hydrocarbons, which may have substitution. $R^1$ and/or $R^2$ here are preferably —CN or —C(O)—$R^3$, where $R^3$ is —NH—$R^4$—$NR^5R^6$, $OR^7$ or $R^8$, and more preferably are —CN or —C(O)—$R^3$ where $R^3$ is —$NR^5R^6$, $OR^7$ or $R^8$, and more preferably are —CN, $OR^7$ or $R^8$. With preference one of the moieties $R^1$ and $R^2$ is a —CN group. The pKa of the compound (d) of the invention at 25° C. in water is preferably 0.5 to 16, preferably 8 to 14.0 and more particularly 8 to 13.5.

Independently of one another in each case, the moieties $R^4$, $R^5$, $R^6$, $R^7$, and $R^8$ are preferably each selected from the group consisting of aliphatic hydrocarbons having 1 to 15, preferably 2 to 10, carbon atoms, which may have substitution. Substituents in that case are preferably one or more isocyanate-reactive groups, which advantageously comprise isocyanate-reactive hydrogen atoms. Groups of this kind that are isocyanate-reactive may be, for example, —OH, —NH— or —$NH_2$ groups, with carboxylic acid groups or carboxylic amide groups preferably not being considered to be isocyanate-reactive groups. Particularly preferred as isocyanate-reactive groups are one or more OH groups, more particularly an OH group. In one particularly preferred embodiment, a compound of the general formula $R^1$—$CH_2$—$R^2$ comprises precisely one isocyanate-reactive group and more particularly an OH group. If $R^3$ is —$NH_2$ or —$NHR^4$, the $NH_2$ or the —$NHR^4$ group is not considered to be an isocyanate-reactive group, unless the moiety $R^4$ is a moiety which carries an —OH, —NH— or —$NH_2$ group.

In a further preferred embodiment, $R^3$ is —$NH_2$, —NH—$CH_3$, —$OCH_3$, —$N(CH_3)_2$ or —NH—$(C_2H_4)$—OH or —$CH_2$—C(O)O—$CH_3$, more preferably —NH—$CH_3$, —$OCH_3$, —$N(CH_3)_2$ or —NH—$(C_2H_4)$—OH or —$CH_2$—C(O)—O—$CH_3$, and more preferably —$OCH_3$, —$N(CH_3)_2$ or —$CH_2$—C(O)—O—$CH_3$. Especially preferred as component (d) are dimethyl 1,3-acetonedicarboxylate, N-methylacetoacetamide, N,N-dimethylacetoacetamide, 2-cyanoacetoacetamide, methyl cyanoacetate, 2-cyano-N-(2-hydroxyethyl)acetamide and methyl-2-(2-hydroxyethylcarbamoyl)ethanol, and more particularly 2-cyano-N-(2-hydroxyethyl)acetamide and methyl-2-(2-hydroxyethylcarbamoyl)ethanol.

The molecular weight of the CH-acidic compound (d) is preferably greater than 250 g/mol, more preferably greater than 300 g/mol, and more particularly greater than 350 g/mol. This is the case especially if the CH-acidic compound (d) has no isocyanate-reactive groups. These compounds preferably have more than one CH-acidic group, more preferably these compounds have 2 to 5 and more particularly 3 or 4 CH-acidic groups. Examples of such compounds are examples thereof are the reaction product of malonic acid and a diol, such as diethylene glycol, more particularly in a molecular ratio of 2:3, or trimethylolpropane triacetoacetate and more particularly trimethylolpropane triacetoacetate.

Quantities of component (d) used for the purposes of the present invention are preferably from 0.01 to 5% by weight, particularly preferably from 0.05 to 2% by weight, and in particular from 0.1 to 1% by weight, based on the total weight of component (a) to (f).

If the intention is that the polyurethane of the invention take the form of polyurethane foam, reaction mixtures of the invention also comprise blowing agent (e). It is possible here to use any of the blowing agents known for the production of polyurethanes. These can comprise chemical and/or physical blowing agents. These blowing agents are described by way of example in "Kunststoffhandbuch [Plastics handbook], volume 7, Polyurethane [Polyurethanes]", Carl Hanser Verlag, $3^{rd}$ edition 1993, chapter 3.4.5. The term chemical blowing agent here means compounds which form gaseous products through reaction with isocyanate. Examples of these blowing agents are water and carboxylic acids. The term physical blowing agents means compounds which have been dissolved or emulsified in the starting materials for the polyurethane production reaction and evaporate under the conditions of formation of polyurethane. These are by way of example hydrocarbons, halogenated hydrocarbons, and other compounds, examples being perfluorinated alkanes such as perfluorohexane, chlorofluorocarbons, and ethers, esters, ketones, acetals, and/or liquid carbon dioxide. Any desired quantity of the blowing agent can be used here. The quantity used of the blowing agent is preferably such that the density of the resultant polyurethane foam is from 10 to 850 g/L, particularly from 20 to 800 g/L, and in particular from 25 to 500 g/L. It is particularly preferable to use blowing agents comprising water.

Chain extenders and crosslinking agents (f) used here can be compounds of molar mass less than 400 g/mol which have at least two groups reactive toward isocyanates, the term chain extenders being used here for molecules having two hydrogen atoms reactive toward isocyanate, and the term crosslinking agent being used here for molecules having more than two hydrogens reactive toward isocyanate. However, it is also possible here to omit the chain extenders or crosslinking agents. Addition of chain extenders, crosslinking agents, or else optionally a mixture thereof can, however, proove to be advantageous for modification of mechanical properties, e.g. hardness.

If chain extenders and/or crosslinking agents (f) are used, use may be made of the chain extenders and/or crosslinking agents known in the production of polyurethanes. These are preferably low-molecular-weight compounds having functional groups reactive toward isocyanates, for example glycerol, trimethylolpropane, glycol, and diamines. Other possible low-molecular-weight chain extenders and/or crosslinking agents are mentioned by way of example in "Kunststoffhandbuch [Plastics handbook], volume 7, Polyurethane [Polyurethanes]", Carl Hanser Verlag, $3^{rd}$ edition 1993, chapter 3.2 and 3.3.2.

It is moreover possible to use auxiliaries and/or additives (g). It is possible here to use any of the auxiliaries and additives known for the production of polyurethanes. Mention may be made by way of example of surface-active substances, foam stabilizers, cell regulators, release agents, fillers, dyes, pigments, flame retardants, hydrolysis stabilizers, fungistatic substances, and bacteriostatic substances. These substances are known and are described by way of example in "Kunststoffhandbuch [Plastics handbook], volume 7, Polyurethane [Polyurethanes]", Carl Hanser Verlag, $3^{rd}$ edition 1993, chapter 3.4.4 and 3.4.6 to 3.4.11.

The quantities of the polyisocyanates (a), the polyols (b), the CH-acidic compound (d) and, if used, the blowing agents (e) and chain extenders, and/or crosslinking agents (f) used in the production of the polyurethane of the invention are generally such that the equivalence ratio of NCO groups of the polyisocyanates (a) to the total number of the reactive hydrogen atoms of components (b), (c), (d), and optionally (e), and (f) is from 0.75 to 1.5:1, preferably from 0.80 to 1.25:1. If the cellular plastics comprise at least some isocyanurate groups, the ratio of NCO groups of the polisocyanates (a) to the total number of the reactive hydrogen atoms of component (b), (c), (d), and optionally (e) and (f) is usually from 1.5 to 20:1, preferably from 1.5 to 8:1. A ratio of 1:1 here corresponds to an isocyanate index of 100.

The quantitative and qualitative differences between the respective starting materials (a) to (g) for the production of polyurethanes of the invention in the form of thermoplastic polyurethane, flexible foam, semirigid foam, rigid foam, or integral foam are only small: by way of example, the production of compact polyurethanes uses no blowing agents, and thermoplastic polyurethane uses preferably strictly difunctional starting materials. It is moreover possible by way of example to vary the resilience and hardness of the polyurethane of the invention by way of the functionality and the chain length of the relatively high-molecular-weight compound having at least two reactive hydrogen atoms. These modifications are known to the person skilled in the art.

The starting materials for the production of a compact polyurethane are described by way of example in EP 0989146 or EP 1460094, the starting materials for the production of a flexible foam are described by way of example in PCT/EP2005/010124 and EP 1529792, the starting materials for the production of a semirigid foam are described by way of example in "Kunststoffhandbuch [Plastics handbook], volume 7, Polyurethane [Polyurethanes]", Carl Hanser Verlag, $3^{rd}$ edition 1993, chapter 5.4, the starting materials for the production of a rigid foam are described in PCT/EP2005/010955, and the starting materials for production of an integral foam are described in EP 364854, U.S. Pat. No. 5,506,275, or EP 897402. The CH-acidic compound (d) is then in each case also added to the starting materials described in said document.

The invention provides not only the process of the invention but also a polyurethane obtainable by a process of the invention. The polyurethanes of the invention are preferably used in enclosed spaces, for example as thermal insulation materials in residential buildings, for example insulation for pipes and refrigerators, in furniture construction, for example as decorative elements or as seat cushioning, and also in automobile interiors, for example as steering wheels, dashboards, door cladding, carpet-backing foam, acoustic foams, for example roof linings, and also headrests, or control buttons. Preference is in particular given here to CH-acidic compound having one or more groups reactive toward isocyanates. These permit linking of the CH-acidic compound (d) to the polyurethane skeleton, giving firstly a longer period of effectiveness, specifically a longer period of aldehyde reduction, under demanding conditions, for example high temperatures or insolation, than in the absence of the groups reactive toward isocyanate. Secondly, CH-acidic compounds (d) having incorporable groups give polyurethanes which exhibit not only low emission of aldehydes but also in general terms lower emissions of volatile organic compounds.

The invention will be illustrated below with reference to examples.

Starting Materials:
Polyol A: Polyetherol with OH number 28 mg KOH/g and functionality 2.7 based on ethylene oxide and propylene oxide, with propylene oxide content 84% by weight and ethylene oxide content 14% by weight
Polyol B: Polyetherol with OH number 250 mg KOH/g and functionality 2.0 based on polyol A (35%), propylene oxide (45%), and dimethylaminopropylamine (20%)
TEOA: Triethanolamine
Isopur SU-12021: Black paste from ISL-Chemie
Jeffcat ZF10: Catalyst from Huntsman
Jeffcat DPA: Catalyst from Huntsman
Additives
A1: dimethyl 1,3-acetonedicarboxylate
A2: N-methylacetoacetamide
A3: N,N-dimethylacetoactamide
A4: 2-cyanoacetoactamide
A5: methyl cyanoacetate
A6: 2-Cyano-N-(2-hydroxyethyl)acetamide
A7: methyl 2-(2-hydroxyethylcarbamoyl)ethanoate
A8: reaction product of malonic acid and diethylene glycol (2:3—Mw 458)
A9: trimethylolpropane triacetoacetate (Mw 386)
A6 and A7 were added in the form of a 10% by weight strength aqueous solution to the mixture A.
Isocyanate A: Mixture of 85 parts of carbodiimide-modified 4,4'-MDI and 15 parts of polymeric diphenylmethane diisocyanate PMDI with NCO content 27.1
The mixture A was produced by mixing the following components:
92.0 parts by weight of polyol A
3.0 parts by weight of polyol B
1.5 parts by weight of TEOA
0.5 parts by weight of Isopur SA-21050
1.9 parts by weight of water
0.4 part by weight of Jeffcat DPA
0.2 part by weight of Jeffcat ZF10
0.5 part by weight of compounds A1 to A7 of table 1

The mixture A and the isocyanate component A, and also the additives of table 1, were mixed with one another with an isocyanate index of 100, and charged to a closed mold to give moldings with an average density of 160 g/L.

Formaldehyde was determined by a procedure based on ASTM D5116-06. The size of the chamber was 4.7 liters. The polyurethane samples used were pieces measuring 110 mm×100 mm×25 mm. When molded foams were tested, parts made of the interior of the foam were used. The temperature of the test chamber during the test was 65° C., and the relative humidity was 50%. The air replacement rate was 3.0 liters per hour. The exhaust air stream with volatile aldehydes from the polyurethane was passed through a cartridge with 2,4-dinitrophenylhydrazine-coated silica during 120 minutes. The DNPH cartridge was then eluted with a mixture of acetonitrile and water. The concentration of formaldehyde of the eluate was determined by means of HPLC. The detection limit for formaldehyde emissions for this setup is ≤11 μg/m³.

TABLE 1 formaldehyde values determined in the chamber for semirigid foams without addition of additives (reference), and also with addition of the respective additives A1 to A9 as in the respective concentrations stated in parts by weight, based on the total weight, of the mixture A.

|  | Conc. in A | Formaldehyde (μg/m³) |
|---|---|---|
| Reference | — | 792 |
| A1 | 0.50% | 142 |
| A2 | 0.50% | 109 |
| A3 | 0.50% | 323 |
| A4 | 0.50% | 133 |
| A5 | 0.50% | 130 |
| A6 | 0.50% | 273 |
| A7 | 0.50% | 282 |
| A8 | 0.50% | 342 |
| A9 | 0.50% | 80 |

TABLE 2

VOC values (ppm) according to VDA 278 of the resulting semirigid foams on addition of the respective additives A4, A5, A6, A7, and A9.

|  | VOC total (ppm) | Remark |
|---|---|---|
| A4 (0.25 p) | 76 | including 32 ppm of A4 |
| A5 (0.25 p) | 133 | including 100 ppm of A5 |
| A6 (0.25 p) | 40 | no A6 or derivatives of A6 detectable |
| A7 (0.25 p) | 54 | no A7 or derivatives of A7 detectable |
| A9 (0.25 p) | 37 | no A9 or derivatives of A9 detectable |

The invention claimed is:

1. A process for producing a polyurethane, the process comprising:
mixing
(a) a polyisocyanate,
(b) polymeric compounds having groups reactive toward isocyanates selected from the group consisting of a polyetherpolyol, a polyesterpolyol and a mixture thereof,
(c) catalysts, comprising incorporable amine catalysts,
(d) a CH-acidic compound of the general formula

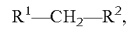

where $R^1$ and $R^2$ independently of one another are an electron-withdrawing moiety of the general formula —C(O)—$R^3$, where the moiety $R^3$ is selected from the group consisting of —$NH_2$, —NH—$R^4$—$NR^5R^6$, $OR^7$ and $R^8$, where $R^4$, $R^5$, $R^6$, $R^7$, and $R^8$ independently are selected from the group consisting of an aliphatic hydrocarbon, an araliphatic hydrocarbon, and an aromatic hydrocarbon, which optionally have substitution, and optionally (e) a blowing agent, (f) a chain extender and/or a crosslinking agent, and (g) auxiliaries and/or additives to give a reaction mixture, and reacting the reaction mixture to give the polyurethane, wherein the compound $R^1$—$CH_2$—$R^2$ has a molecular weight greater than 300 g/mol, and wherein a molecular weight on the polymeric compounds b) is from 400 to 15,000 g/mol and a functionality of the polymeric compounds b) is from 2 to 8.

2. The process as claimed in claim 1, wherein the moiety $R^3$ is —NH—$R^4$—$NR^5R^6$, $OR^7$, or $R^8$, and the moieties $R^4$, $R^5$, $R^6$, $R^7$, and $R^8$ are each independently of one another an aliphatic hydrocarbon having from 1 to 15 carbon atoms, which may optionally be substituted.

3. The process as claimed in claim 1, wherein the groups reactive toward isocyanates are selected from the group consisting of —OH, —NH— and —$NH_2$ groups.

4. The process as claimed in claim 1, wherein the quantity of component (d), based on the total weight of components (a) to (f), is from 0.01 to 5% by weight.

5. The process as claimed in claim 1, wherein the polymeric compounds (b) having groups reactive toward isocyanates comprise polyetherols.

6. The process as claimed in claim 1, wherein the incorporable amine catalysts comprise a group reactive toward isocyanates, and one or more tertiary aliphatic amino groups.

7. The process as claimed in claim 6, wherein at least one tertiary amino group comprises two moieties selected mutually independently from a methyl and an ethyl moiety, and another organic moiety.

8. The process as claimed in claim 1, wherein the polyurethane is a polyurethane foam with an average density of from 20 to 850 g/L.

9. The process as claimed in claim 1, wherein the polyurethane is a compact polyurethane with an average density of more than 850 g/L.

10. The process as claimed in claim 9, wherein the polyurethane is cable-sheathing.

11. A polyurethane, produced by the process as claimed in claim 1.

12. An interior of means of transport, comprising the polyurethane as claimed in claim 11.

13. The process as claimed in claim 1, wherein the CH-acidic compound (d) comprises more than one CH-acidic group.

* * * * *

UNITED STATES PATENT AND TRADEMARK OFFICE
CERTIFICATE OF CORRECTION

PATENT NO.        : 10,196,493 B2
APPLICATION NO.   : 15/100777
DATED             : February 5, 2019
INVENTOR(S)       : Iran Otero Martinez et al.

Page 1 of 1

It is certified that error appears in the above-identified patent and that said Letters Patent is hereby corrected as shown below:

In the Specification

In Column 4, Line 27, delete "2,6-diisocynate" and insert -- 2,6-diisocyanate --, therefor.

In Column 5, Line 60, delete "3-dimethyaminopropyl" and insert -- 3-dimethylaminopropyl --, therefor.

In Column 6, Line 18, delete "octoate" and insert -- octanoate --, therefor.

In Column 6, Line 18, delete "ethylhexoate" and insert -- ethylhexanoate --, therefor.

In Column 7, Line 55, delete "pertluorinated" and insert -- perfluorinated --, therefor.

In Column 8, Lines 39-40, delete "polisocyanates" and insert -- polyisocyanates --, therefor.

In Column 9, Line 45, delete "dimethylacetoactamide" and insert -- dimethylacetoacetamide --, therefor.

In Column 9, Line 46, delete "2-cyanoacetoactamide" and insert -- 2-cyanoacetoacetamide --, therefor.

Signed and Sealed this
Twenty-first Day of April, 2020

Andrei Iancu
*Director of the United States Patent and Trademark Office*